US012490751B2

(12) United States Patent
Cambre et al.

(10) Patent No.: US 12,490,751 B2
(45) Date of Patent: Dec. 9, 2025

(54) DUAL WATERFALL CABINET FOR FOOD PROCESSING APPLICATIONS

(71) Applicant: SAFE FOODS CORPORATION, North Little Rock, AR (US)

(72) Inventors: Jude Cambre, Denham Springs, LA (US); Douglas M. Dawson, Sherwood, AR (US)

(73) Assignee: Safe Foods Corporation, North Little Rock, AR (US)

( * ) Notice: Subject to any disclaimer, the term of this patent is extended or adjusted under 35 U.S.C. 154(b) by 241 days.

(21) Appl. No.: 18/532,331

(22) Filed: Dec. 7, 2023

(65) Prior Publication Data

US 2024/0122190 A1 Apr. 18, 2024

Related U.S. Application Data

(63) Continuation of application No. PCT/US2022/075054, filed on Aug. 17, 2022.

(60) Provisional application No. 63/260,336, filed on Aug. 17, 2021.

(51) Int. Cl.
*A23B 4/18* (2006.01)
*A22B 7/00* (2006.01)
*A22C 21/00* (2006.01)

(52) U.S. Cl.
CPC .............. *A23B 4/18* (2013.01); *A22B 7/001* (2013.01); *A22C 21/0046* (2013.01)

(58) Field of Classification Search
CPC ........ A23B 4/18; A22B 7/001; A22C 21/0046

USPC ............................................................ 239/16
See application file for complete search history.

(56) References Cited

U.S. PATENT DOCUMENTS

| 4,196,221 | A | * | 4/1980 | Dew | ...................... | A22C 21/02 |
| | | | | | | 426/235 |
| 5,484,332 | A | | 1/1996 | Leech et al. | | |
| 5,711,981 | A | | 1/1998 | Wilson et al. | | |
| 5,882,253 | A | | 3/1999 | Mostoller | | |
| 2011/0136421 | A1 | | 6/2011 | Brink et al. | | |
| 2017/0238563 | A1 | * | 8/2017 | Larson | ................... | A22B 7/002 |
| 2018/0035683 | A1 | * | 2/2018 | Thrane | ..................... | A22B 5/08 |
| 2022/0408742 | A1 | * | 12/2022 | Jensen | ............... | A22C 21/0053 |

OTHER PUBLICATIONS

International Search Report and Written Opinion issued by the United States Patent and Trademark Office as International Searching Authority for International Application No. PCT/US2022/075054, dated Nov. 15, 2022, 9 pgs.
International Preliminary Report on Patentability issued by the International Bureau of WIPO for International Patent Application No. PCT/US2022/075054, dated Feb. 13, 2024, 8 pgs.

* cited by examiner

*Primary Examiner* — Brady W Frazier
(74) *Attorney, Agent, or Firm* — Haynes and Boone, LLP; Randall C. Brown; Michael J. Tobin

(57) ABSTRACT

A dual waterfall cabinet includes a hollow basin having front and rear openings to allow workpieces to move therethrough. The cabinet also includes waterfall assemblies on either side of the hollow basin that form waterfalls of solution to be applied to the workpieces. To provide thorough interior and exterior coverage, the distance between the waterfalls can vary along a length of the cabinet.

20 Claims, 5 Drawing Sheets

DUAL WATERFALL CABINET FOR FOOD PROCESSING APPLICATIONS

CROSS-REFERENCE TO RELATED APPLICATIONS

This application is a continuation of PCT International Patent Application No. PCT/US2022/075054 filed Aug. 17, 2022, which claims priority to U.S. Provisional Patent Application No. 63/260,336 filed Aug. 17, 2021, entitled "DUAL WATERFALL CABINET FOR ANTIMICROBIAL APPLICATIONS IN POULTRY PROCESSING," the entirety of which is hereby incorporated by reference.

FIELD OF THE DISCLOSURE

The present disclosure relates to an apparatus and system for food processing. More particularly, the disclosure relates to a waterfall cabinet for applying a solution to food workpieces, such as poultry.

BACKGROUND

Poultry processing establishments transform a live animal to whole carcasses or individual parts for consumption by the general public. The process of this transformation requires multiple antimicrobial interventions. Spray bars & dip tanks of varying size are extremely common in food processing establishments, and each present challenges and limitations in terms of the application of the antimicrobial as well as the sanitation/cleaning process. Spray bars or cabinets typically lack adequate coverage and volume compared to dip tanks and nozzles are frequently clogged or improperly aligned. Dip tanks, however, take up valuable space and require significant water and antimicrobial resources. A need exists to improve overall coverage of poultry product while reducing the size of the footprint in the facility and reducing the burdens of the sanitation process. This need can be addressed by the dual waterfall cabinet disclosed herein.

BRIEF DESCRIPTION OF THE DRAWINGS

Various embodiments of the present disclosure will be understood more fully from the detailed description given below and from the accompanying drawings. In the drawings, like reference numbers may indicate identical or functionally similar elements. Embodiments are described in detail hereinafter with reference to the accompanying figures, in which.

DETAILED DESCRIPTION

Figure 1:
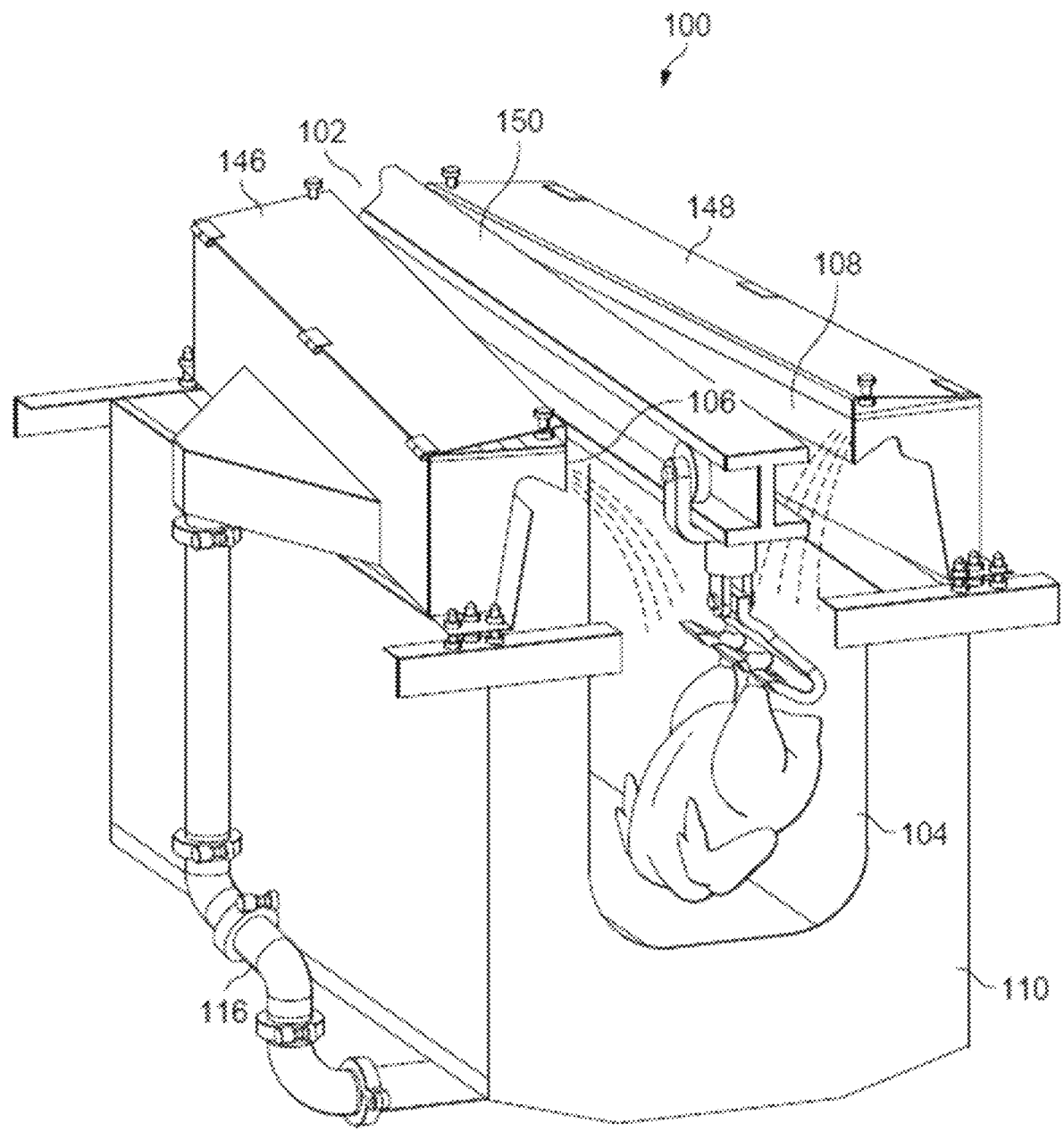
FIG. 1 is a perspective view of a dual waterfall cabinet according to an embodiment of the present disclosure.

The following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Turning to FIG. 1, the dual waterfall cabinet 100 may be designed for use with any chemistry. For example, in some embodiments, the solution used with the cabinet 100 may be an antimicrobial agent, such as organic acids (e.g., peroxyacetic acid), bleach, or other commercially available food safe antimicrobials (e.g., CECURE® which is a composition that includes cetylpyridinium chloride (CPC) and is commercially available from Safe Foods Corporation). In some embodiments, the cabinet 100 may be used with a pH adjuster solution (i.e., a food safe acid or base), with or without an antimicrobial agent. That is, although "antimicrobial solution" is referenced herein, in some embodiments, the solution may be devoid of an antimicrobial agent. The cabinet 100 may be hung from a shackle line such that workpieces (e.g., poultry carcasses, other animal carcasses, or vegetables) enter through an entrance 102 of the cabinet 100 and exit through an exit 104 opposite the entrance 102. The cabinet 102 includes a first waterfall assembly 146 including a first waterfall 106 and a second waterfall assembly 148 including a second waterfall 108 configured to be aligned with or above the workpieces, such that the waterfalls 106, 108 apply antimicrobial solution to the workpieces as they travel through the cabinet 100. Application of the antimicrobial solution may include application to exterior surfaces and filling internal cavities of the workpieces (e.g., in the case of poultry carcasses). The waterfalls 106, 108 are troughs having a straight edge positioned toward an interior of the cabinet 100 such that, as antimicrobial solution is supplied to the waterfalls 106, 108, the solution spills over the straight edges in a waterfall into the interior of the cabinet 100.

Figure 2:
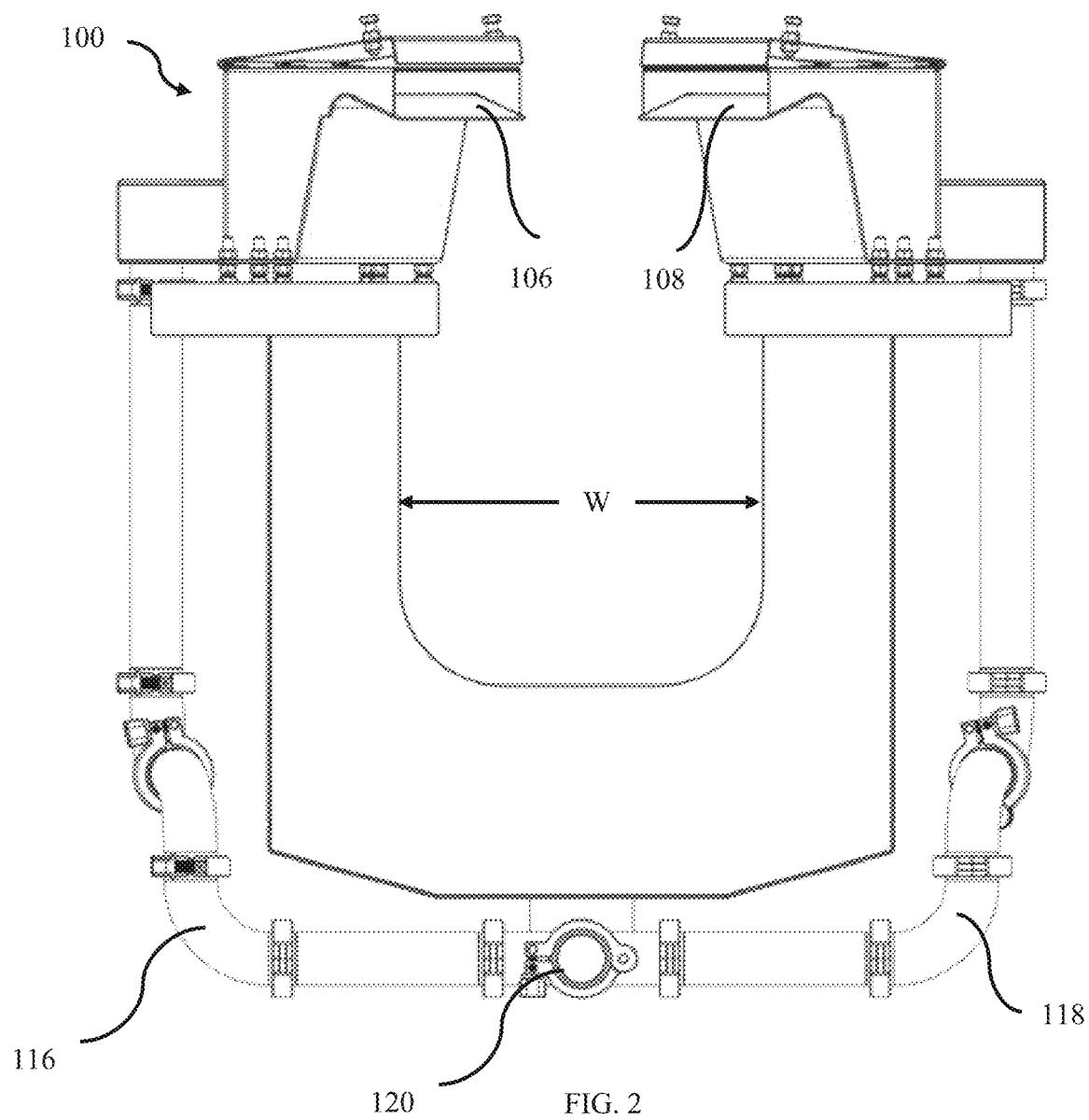
FIG. 2 is a rear view of the cabinet of FIG. 1.

As shown in FIG. 2, the waterfalls 106, 108 are respectively supplied with an antimicrobial solution from a first supply line 116 and a second supply line 118. In some embodiments, the first and second supply lines 116, 118 may be supplied by a single source 120. In other embodiments, supply lines 116, 118 may be separately supplied. In any embodiment, the cabinet 100 may include one or more meters measuring a flow rate and/or a total amount of solution supplied to the cabinet 100 (i.e., the first and second supply lines 116, 118 and subsequently through waterfalls 106, 108). In some embodiments, the cabinet 100 may also include a meter measuring the flow of solution through a drain 112 (shown in more detail in FIGS. 4 and 5). In some embodiments, the antimicrobial solution may pass through the drain 112 and be recycled into the cabinet 100. In such embodiments, recycling may include treating the antimicrobial solution by, e.g., removing solids and/or adding reagents (e.g., additional antimicrobial or a pH adjuster) to maintain desired characteristics (e.g., antimicrobial level or pH).

The cabinet 100 may include a control panel configured to control the flow of the antimicrobial solution through the first and second supply lines 116, 118. In some embodiments, the control panel may also provide real time data related to, e.g., antimicrobial solution used (total antimicrobial solution through the first and second supply lines 116, 118 for a given period of time), water savings (antimicrobial solution recycled through the drain 112), and antimicrobial solution lost (total antimicrobial solution through first and second supply lines 116, 118 minus antimicrobial solution recycled through the drain 112).

The waterfalls 106, 108 are supplied with sufficient antimicrobial solution to maintain a constant waterfall of antimicrobial solution. When the rate is too low, the waterfalls may break up or collapse. The rate may vary depending on the size (length) of the waterfalls 106, 108. In some embodiments, the waterfalls 106, 108 are about 4 feet or about 3 to 5 feet in length from the entrance 102 to the exit 104 and a rate of antimicrobial solution supplied to each waterfall is about 5 to 30 gallons per minute (gpm), about 10 to 25 gpm, about 15 to 25, or about 21 to 23 gpm.

In operation, the waterfalls 106, 108 apply the antimicrobial solution to workpieces hung on a shackle line. As the workpieces travel through the cabinet 100, the waterfalls 106, 108 which are positioned above each side of the workpieces overflow to wash the workpieces both inside and out. In some embodiments, the waterfalls 106, 108 are positioned from 0 to 8 inches above the top of the workpieces to allow proper filling and washing of the internal cavity of the workpieces. In some embodiments, the waterfalls 106, 108 are positioned 4 to 6 inches above the top of the workpieces for optimal antimicrobial application.

A portion of the antimicrobial solution is maintained on or in the workpieces and carried out of the cabinet 100. A remainder of the antimicrobial solution drips into a hollow basin 110 and is collected via the drain 112 as described above. In some embodiments, the drain 112 may include a cover, such as a mesh, to prevent blockage thereof by solid material.

Figure 3:
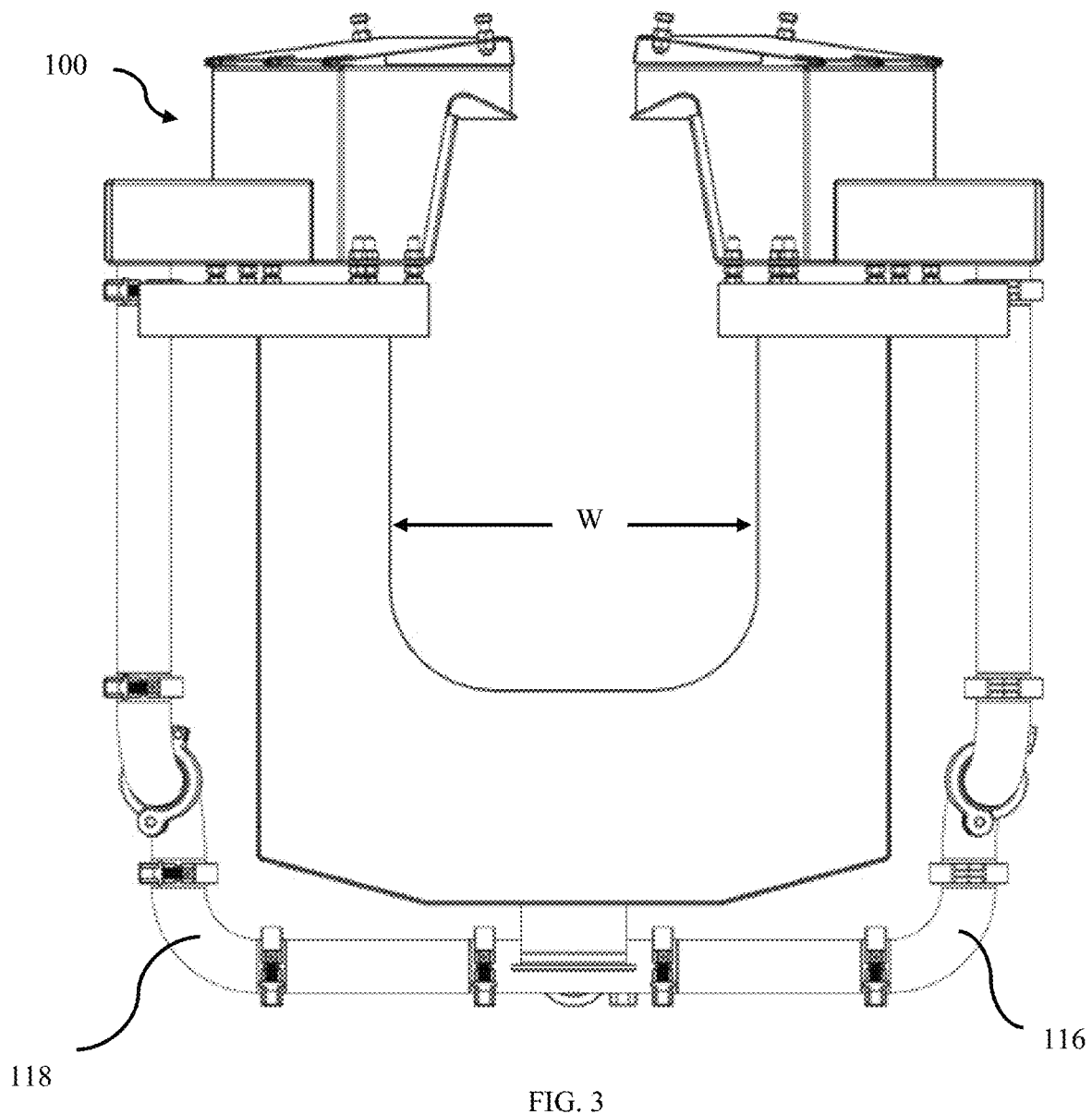
FIG. 3 is a front view of the cabinet of FIG. 1.

As shown in FIGS. 1-3, the basin 110 includes openings at the entrance 102 and exit 104 of the cabinet 100 to allow workpieces to move therethrough. The waterfall assemblies 146, 148 are affixed to sidewalls of the basin 110 and produce waterfalls (via waterfalls 106, 108) that flow into the basin 110. In some embodiments, an opening in the basin 110 has a width W of at least 10 inches, at least 12 inches, at least 18 inches, at least 20 inches or about 10 to 36 inches. In some embodiments, the basin 110 has a length (from the entrance 102 to the exit 104) of about 4 feet or about 3 to 5 feet. In some embodiments, the basin 110 has a width (measured between sidewalls thereof) of about 2 feet or about 18 inches to about 4 feet. The basin 110 may be shaped and sized according to the application of the cabinet 100, wherein larger workpieces will require a larger basin 110 having a wider opening.

Figure 5:
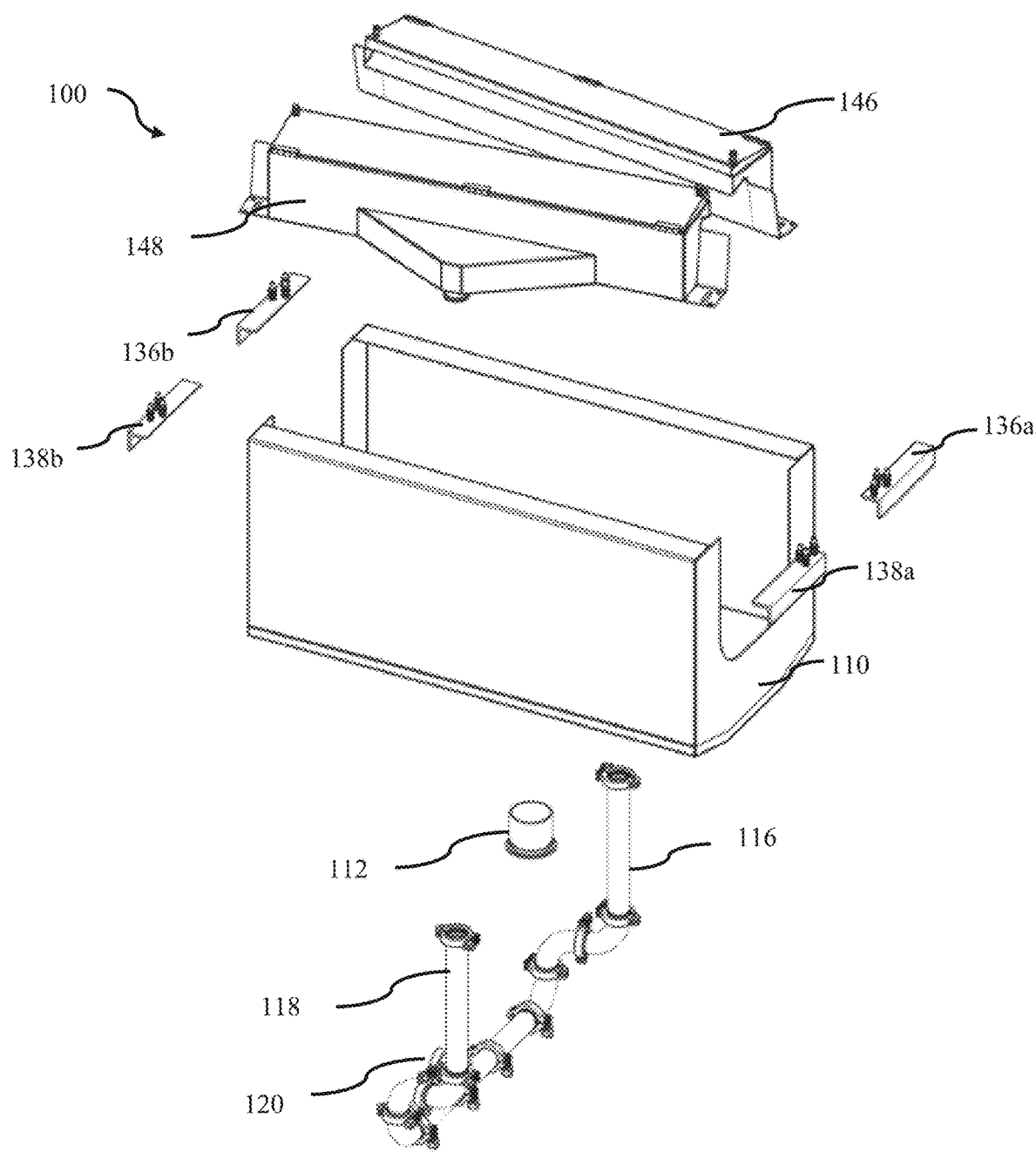
FIG. 5 is an exploded view of the cabinet of FIG. 1.

In some embodiments, the cabinet 100 may be designed with threaded rod (as shown in FIG. 5) to easily adjust the angles and width between the waterfalls 106, 108 of the cabinet 100 for optimal cavity fill and coverage. Standard spray or drench cabinets utilized by the poultry industry historically use a low volume of antimicrobial solution, averaging an estimated 0.75 gallons per carcass in current heavy flow application points. The dual waterfall cabinet 100 may increase the amount of antimicrobial solution applied to an estimated 2 to 4 gallons per workpiece. This increase affects both the internal cavity surface as well as the exterior surface of the workpiece. Standard cabinets provide minimal coverage of the interior cavity of the workpieces; however, this is also a source of high potential contamination and pathogens. Heavy-flow drench cabinets target approximately 25 to 30 mL to be considered acceptable. The dual waterfall cabinet 100 is designed to consistently apply over 50 mL to the interior cavity of the workpieces.

In some embodiments, the dual waterfall cabinet 100 is designed in a V-shaped pattern, narrower at the entrance 102 and wider at the exit 104. This design of widening the waterfalls 106, 108 as the workpiece travels through the cabinet 100 allows for early internal cavity fill then widening to ensure full exterior workpiece coverage. The widening as the workpiece exits also allows for improved antimicrobial solution recovery inside the dual waterfall cabinet 100. The waterfalls 106, 108 are also designed to be adjustable on each plane to optimize antimicrobial coverage and account for the full range of workpiece sizes. The V-shape can be narrowed or widened, raised or lowered on each end to fine-tune coverage of the antimicrobial solution on the workpieces. Although the cabinet 100 has been described has having widening waterfalls 106, 108, in some embodiments the waterfalls 106, 108 may be parallel. In other embodiments, the waterfalls 106, 108 may narrow from the entrance 102 to the exit 104 (e.g., the orientation of the cabinet 100 may be reversed).

Figure 4:
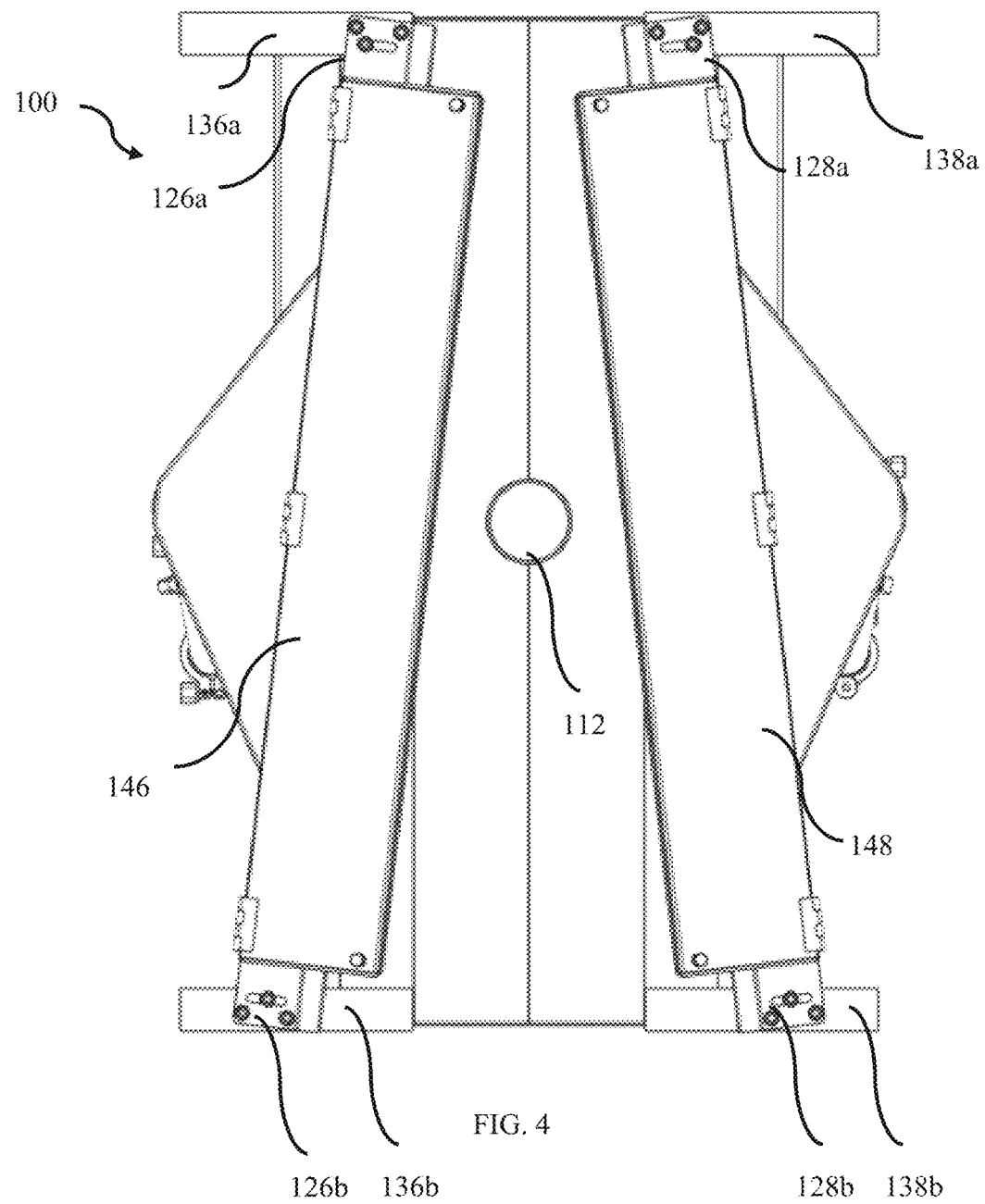
FIG. 4 is a top view of the cabinet of FIG. 1.

Referring to FIGS. 4 and 5, the cabinet 100 may include adjustable mounting brackets that enable modification of the angle of the waterfalls 106, 108. In particular, the cabinet may include a first front bracket 136a, a first rear bracket 136b, a second front bracket 138a, and a second rear bracket 138b each affixed to the basin 110. The first waterfall assembly 146 (including the first waterfall 106) may include a first front waterfall bracket 126a configured to adjustably affix the first waterfall assembly 146 to the first front bracket 136a and a first rear waterfall bracket 126b configured to adjustably affix the first waterfall assembly 146 to the first rear bracket 136b. The second waterfall assembly 148 (including the second waterfall 108) may include a second front waterfall bracket 128a configured to adjustably affix the second waterfall assembly 148 to the second front bracket 138a and a second rear waterfall bracket 128b configured to adjustably affix the second waterfall assembly 148 to the second rear bracket 138b. Connections between the foregoing parts may be formed by any suitable means, such as by nuts and bolts. In some embodiments, an angle between the waterfalls 106, 108 may range from 0 degrees (parallel) to 60 degrees, greater than 0 degrees to 45 degrees, or 10 to 30 degrees.

In some embodiments, the brackets 136a, 136b, 138a, and 138b may be integrally formed with the basin 110. In some embodiments, the brackets 126a and 126b are integrally formed with the first waterfall assembly 146 and the brackets 128a and 128b are integrally formed with the second waterfall assembly 148.

In some embodiments, the waterfalls 106, 108 may be positioned at an angle greater than or less than 0 degrees with respect to a horizontal axis. For instance, front ends of the waterfalls 106, 108 (proximate entrance 102) may be raised with respect to rear ends (proximate exit 104) in order to increase the flow of the antimicrobial solution near the entrance 102. Conversely, the rear ends of the waterfalls 106, 108 may be raised with respect to the front ends in order to increase the flow of the antimicrobial solution near the exit 104.

In some embodiments, the cabinet 100 is about 4 feet, about 2 to 6 feet, or about 3 to 5 feet in length (from front end to rear end), about 2 feet or about 18 inches to 4 feet wide, and about 3 feet or about 2 to 5 feet tall (from the drain 112 to the tops of the waterfall assemblies 146, 148). As described above with respect to the basin 110, the cabinet 100 may be sized and shaped according to the particular application, wherein the foregoing dimensions may be best suited for poultry carcasses. The cabinet 100 may be larger or smaller depending on the workpieces. Additionally, the length of the cabinet 100 may be adjusted to increase or decrease the dwell time of the workpieces within the cabinet. Similarly, the flow rate of the antimicrobial solution to the first and second waterfalls 106, 108 may be adjusted in view of the length thereof in order to apply a desired amount of solution to each workpiece.

A system is also described herein. The system includes the cabinet 100 suspended off the ground (e.g., 1 to 30 feet) and fixed about a shackle line, wherein the shackle line is configured to move workpieces laterally through the cabinet 100. The cabinet 100 may include mounting brackets (not shown) for suspending the cabinet 100 about the shackle line. For example, an L angle bracket may be attached above the shackle line perpendicularly and welded tubing and threading may be employed to attach the cabinet 100 to the bracket. In some embodiments, the shackle line is configured to move workpieces at a rate of 40 to 240, 80 to 240, or 100 to 200 per minute, wherein the workpieces each occupy about 6 to 18 inches and are tightly packed along the shackle line. The system may include a recycling unit in fluid communication with the cabinet 100 and configured to recycle solution from the drain 112 of the cabinet back to the first and second supply lines 116, 118 (e.g., through source 120). The recycling unit may function as described above to, e.g., remove solids and/or augment the composition of the antimicrobial solution. The system further includes an antimicrobial supply containing antimicrobial solution and configured to supply the same to the first and second supply lines 116, 118 of the cabinet 100.

A method of treating workpieces with antimicrobial solution is also described herein. The method includes supplying antimicrobial solution to the waterfalls 106, 108 at a rate sufficient to maintain the waterfalls and passing workpieces through the waterfalls to apply the antimicrobial solution to the workpieces. The method may further include steps of collecting antimicrobial solution that drips from the workpieces (e.g., in drain 100) and recycling the collected antimicrobial solution back into the cabinet 100.

The benefits of the present cabinet 100, the system including the same, and the method of using the same are apparent from the foregoing. These include, but are not limited to, adjustability to accommodate a variety of applications and sizes of workpieces; increased antimicrobial coverage by virtue of waterfall design and varying distance between the waterfalls; water savings through recycling of spent antimicrobial solution; and small footprint as the cabinet is compact and may be suspended thereby not occupying any floor space. Also, in comparison to dip tanks, when the process needs to be stopped (e.g., for maintenance), the flow of antimicrobial solution can easily be cut off to the waterfall cabinet such that the workpieces will not be left to sit in antimicrobial solution.

Although various embodiments have been shown and described, the disclosure is not limited to such embodiments and will be understood to include all modifications and variations as would be apparent to one of ordinary skill in the art. Therefore, it should be understood that the disclosure is not intended to be limited to the particular forms disclosed; rather, the intention is to cover all modifications, equivalents, and alternatives falling within the spirit and scope of the disclosure as defined by the appended claims.

What is claimed is:

1. An apparatus comprising:
    a hollow basin comprising first and second sidewalls opposite one another, a front end having an opening therethrough, and a rear end having an opening therethrough;
    a first waterfall assembly affixed to the first sidewall, wherein the first waterfall assembly comprises a first trough extending substantially from the front end to the rear end;
    a second waterfall assembly affixed to the second sidewall, wherein the second waterfall assembly comprises a second trough extending substantially from the front end to the rear end;
    a first supply line configured to supply a solution to the first waterfall assembly such that the solution spills from the first trough into the hollow basin; and
    a second supply line configured to supply the solution to the second waterfall assembly such that the solution spills from the second trough into the hollow basin;
    wherein the solution comprises an antimicrobial agent and/or a pH adjuster.

2. The apparatus of claim 1, further comprising a drain positioned within the hollow basin and configured to collect at least a portion of the solution from the first and second troughs.

3. The apparatus of claim 1, further comprising a first meter positioned along the first supply line and configured to measure a first flow rate of solution through the first supply line and/or a second meter positioned along the second supply line and configured to measure a second flow rate of solution through the second supply line.

4. The apparatus of claim 3, further comprising a control panel in communication with the first meter and/or the second meter, wherein the control panel is configured to control the first flow rate and/or the second flow rate.

5. The apparatus of claim 1, further comprising a first front bracket and a second front bracket affixed to the front end of the hollow basin and a first rear bracket and a second rear bracket affixed to the rear end of the hollow basin;
    wherein the first waterfall assembly comprises a first front waterfall bracket configured to be adjustably affixed to the first front bracket and a first rear waterfall bracket configured to be adjustably affixed to the first rear bracket; and
    wherein the second waterfall assembly comprises a second front waterfall bracket configured to be adjustably affixed to the second front bracket and a second rear waterfall bracket configured to be adjustably affixed to the second rear bracket.

6. The apparatus of claim 5, wherein an angle between the first waterfall assembly and the second waterfall assembly is adjustable between 0 and 60 degrees.

7. The apparatus of claim 1, wherein a distance between the first waterfall assembly and the second waterfall assembly at the front end is less than a distance between the first waterfall assembly and the second waterfall assembly at the rear end.

8. The apparatus of claim 1, wherein the apparatus is configured to be suspended off of the ground.

9. A system comprising:
    a waterfall cabinet comprising:
        a hollow basin comprising first and second sidewalls opposite one another, a front end having an opening therethrough, and a rear end having an opening therethrough;
        a first waterfall assembly affixed to the first sidewall, wherein the first waterfall assembly comprises a first trough extending substantially from the front end to the rear end;
        a second waterfall assembly affixed to the second sidewall, wherein the second waterfall assembly comprises a second trough extending substantially from the front end to the rear end;
        a first supply line configured to supply solution to the first waterfall assembly such that solution spills from the first trough into the hollow basin; and a second supply line configured to supply the solution to the second waterfall assembly such that the solution spills from the second trough into the hollow basin;

a solution supply comprising the solution and configured to supply the solution to the first and second supply lines; and a shackle line configured to suspend workpieces therefrom;

wherein the solution comprises an antimicrobial agent and/or a pH adjuster;

wherein the waterfall cabinet is suspended about the shackle line; and wherein the shackle line is configured to move the workpieces through the openings of the front and rear ends of the hollow basin.

10. The system of claim 9, wherein the hollow basin comprises a drain positioned within the hollow basin and configured to collect at least a portion of the solution from the first and second troughs.

11. The system of claim 10, further comprising a recycling unit configured to recycle the solution from the drain back to the first and second waterfall assemblies.

12. The system of claim 11, wherein the recycling unit is configured to remove solid materials from the solution.

13. The system of claim 9, wherein the waterfall cabinet is suspended from 1 to 30 feet off of the ground.

14. The system of claim 9, wherein the waterfall cabinet is positioned about the shackle line such that the first and second troughs are from 0 to 8 inches above the workpieces.

15. The system of claim 14, wherein the first and second troughs are from 4 to 6 inches above the workpieces.

16. The system of claim 9, wherein the solution is supplied at a rate of 10 to 30 gallons per minute to each of the first supply line and the second supply line.

17. A method of applying a solution to workpieces, comprising:

suspending workpieces from a shackle line;

suspending a waterfall cabinet about the shackle line, wherein the waterfall cabinet comprises:
- a hollow basin comprising first and second sidewalls opposite one another, a front end having an opening therethrough, and a rear end having an opening therethrough;
- a first waterfall assembly affixed to the first sidewall, wherein the first waterfall assembly comprises a first trough extending substantially from the front end to the rear end;
- a second waterfall assembly affixed to the second sidewall, wherein the second waterfall assembly comprises a second trough extending substantially from the front end to the rear end;

supplying the solution to the first and second waterfall assemblies such that the solution forms a first waterfall from the first trough into the hollow basin and a second waterfall from the second trough into the hollow basin; and moving the workpieces along the shackle line through the opening of the front end of the hollow basin, through the first and second waterfalls, and out through the opening of the rear end of the hollow basin;

wherein the solution comprises an antimicrobial agent and/or a pH adjuster.

18. The method of claim 17, further comprising collecting the solution in the hollow basin and recycling the solution back into the first and second waterfall assemblies.

19. The method of claim 18, wherein recycling comprises filtering the solution to remove solids therefrom.

20. The method of claim 17, wherein a distance between the first waterfall and the second waterfall proximate the front end is less than a distance between the first waterfall and the second waterfall proximate the rear end.

* * * * *